United States Patent [19]

Engle

[11] Patent Number: 5,561,548

[45] Date of Patent: * Oct. 1, 1996

[54] ENHANCED MEMBRANE LIGHT MODULATOR

[76] Inventor: Craig D. Engle, 336 Cline Ave., Griffith, Ind. 46319

[ * ] Notice: The portion of the term of this patent subsequent to Sep. 29, 2012, has been disclaimed.

[21] Appl. No.: 958,642

[22] Filed: Oct. 7, 1992

[51] Int. Cl.$^6$ ..................................................... G02F 1/29
[52] U.S. Cl. ........................ 359/292; 359/295; 348/764; 348/770
[58] Field of Search ................................... 359/292, 295, 359/279; 358/62, 233

[56] References Cited

U.S. PATENT DOCUMENTS

| | | | |
|---|---|---|---|
| 2,644,208 | 7/1953 | Auphan | 22/190 |
| 2,681,423 | 6/1954 | Auphan | |
| 2,682,010 | 6/1954 | Orthbuer | 315/3 |
| 2,733,501 | 2/1956 | Orthuber et al. | 29/25.17 |
| 3,463,572 | 8/1969 | Preston | 359/295 |
| 3,654,606 | 4/1972 | Marlowe et al. | 340/166 |
| 3,796,480 | 3/1974 | Preston et al. | 359/295 |
| 3,798,620 | 3/1974 | Costentino | 340/173 LT |
| 4,441,791 | 4/1984 | Hornbeck | 350/360 |
| 4,694,287 | 9/1987 | Chenevas-Paule et al. | 359/59 |
| 4,731,610 | 3/1988 | Baron et al. | 340/784 |
| 4,956,619 | 9/1990 | Hornbeck | 330/4.3 |

OTHER PUBLICATIONS

Larry J. Hornbeck, 128×128 Deformable Mirror Device, IEEE Transactions on Electron Devices, vol. ED–30, No. 5, May 1983.
Robert E. Brooks, Micromechanical Light Modulators on Silicon, Optical Engineering/Jan/Feb. 1985, vol. 24, No. 1.
Bernard J. Lechner et al, Liquid Crystal Matrix Displays, Proceedings of the IEEE, vol. 59, No. 11, Nov. 1971.
D. Hulsenberg and R. Bruntech, Glasses, and Glass–Ceramics for Applications in Micromechanics, Journal of Non–Crystalline Solids, 129 (1991) 199–205.
John A. van Raalts, Reflective Liquid Crystal Television Display, Proceedings of the IEEE vol. 56, No. 12, Dec. 1968.
O. F. Hamann, Random Access Light Value Study, Technical Report, RADC–TR–65–451, Jan. 1966, pp. 25–28.
P. G. Lecomber, Present and Future Applications of Amorphous Silicon and It's Alive, Journal of Non–Crystalline Solids 115, (1989) 1–13.
Encyclopedia of Semiconductor Technology, John Wiley & Sons, 1984, pp. 369, 371, TK7871.85 E5 1984.

Primary Examiner—F. Daniel Lopez
Attorney, Agent, or Firm—Wood, Phillips, VanSanten, Clark & Mortimer

[57] ABSTRACT

A membrane light modulator contains a substrate, the substrate contains a first face and a second face. A plurality of first electrodes is arranged in a matrix of p rows and q columns. Each first electrode is affixed to the substrate by a suitable means. Each column of first electrodes is overlapped by a respective deformable reflective column conductor. Each column conductor is affixed to the first face by a suitable means. Each first electrode is electrically connected to a respective third switch terminal of a respective switching element. Each switching element is affixed to the second face by a suitable means. Each first electrode overlaps the respective switching element. A suitable potential control means is provided to control the potential difference between each first electrode and the respective column conductor in accordance with a input signal. Affixing switching elements to the second face and column conductors to the first face provides fabrication flexibility to enhance commercial viability. A no crossover switch matrix addressing configuration further enhances reliability and commercial viability of the modulator.

16 Claims, 1 Drawing Sheet

ENHANCED MEMBRANE LIGHT MODULATOR

BACKGROUND-FIELD OF INVENTION

This invention relates to methods of construction and addressing of membrane light modulators.

BACKGROUND-PRIOR ART

As identified in the patent application to Craig D. Engle titled "Enhanced Surface Deformation Light Modulator", membrane light modulators have suffered from a variety of problems. In addition to the problems cited therein, several of the matrix addressing configurations employed with membrane light modulators are fabricated utilizing "front side" components. Terminology of front side versus backside components, and device configurations employing these approaches, are presented in the article "128×128 Deformable Mirror Device" by Larry J. Hornbeck, IEEE Transactions on Electron Devices, Vol. ED-30, No. 5 May 1983. Examples of front side component configurations include U.S. Pat. No. 4,441,791 to Hornbeck, Apr. 10, 1984. Consequences of front side processing include merging fabrication sequences involving semiconductor circuits and membrane media. As evidenced by the comments in the article "Micromechanical Light Modulators on Silicon" by Robert E. Brooks, integration of membrane modulators on semiconductor integrated circuits is not completely compatible. Due to the complexities of fabricating configurations similar to U.S. Pat. No. 4,441,791, exposure to contamination could be increased. As identified in U.S. Pat. No. 4,956,619, to Hornbeck, Sep. 11, 1990, configurations similar to U.S. Pat. No. 4,441,791 are plagued by contamination problems which adversely effect manufacturability. As to be shown herein, the backside configuration of my invention could increase the flexibility of fabrication sequences which could be utilized to fabricate components affixed to respective faces, without unduly influencing the components affixed to the other face. Such flexibility provides opportunities to effectively deal with, or reduce the impact of, contamination,, thereby enhancing the commercial viability of membrane light modulators.

Backside configurations which have been utilized with membrane light modulators include U.S. Pat. No. 3,798,620 to Cosentino, Mar. 19, 1974. Although this configuration provides several benefits due to backside components, the method of construction in U.S. Pat. No. 3,798,620 involves discrete addressing components affixed to the backside of the substrate. Bonding addressing components could lead to reliability problems in large arrays. As identified in the patent application submitted by Craig D. Engle, titled "Enhanced Surface Deformation Light Modulator, filed Sep. 29, 1992, Ser. No. 07/953,118, U.S. Pat. No. 2,681,423 to Auphan identifies several different reflective conductor embodiments which could be utilized in electrostatic light modulators. As stated in the objectives of Auphan, "It is another object of the present invention to provide a light reflecting screen consisting of strips which are not insulated from one another." As to be shown herein, such a constraint could adversely effect reliability of matrix addressed electrostatic light modulators.

U.S. Pat. No. 3,798,620, to Cosentino, Mar. 19, 1974 utilizes a monolithic electrode affixed to a first surface of an insulating substrate and switching elements affixed to the second surface of the substrate. The electrode configuration of U.S. Pat. No. 3,798,620 does not eliminate electrical crossover networks and actually increases the number of bonding operations associated with affixing switching elements to the second surface of the substrate by transferring the electrical crossover network requirement to the semiconductor interface component. As to be shown herein, more desirable alternatives exist.

In addition, transferring the electrical crossover requirements to the electronic interface component hinders integration of alternative switching elements since the semiconductor components must have a packaging configuration which can accommodate the crossover buss.

As to be shown herein, my invention does not require the column conductors to have the same electrical potential as in prior art implementations. This latitude is essential for eliminating electrical crossover networks and enhancing reliability and other considerations of the modulator. Eliminating electrical crossover networks would eliminate the need for semiconductor interface components to incorporate packaging considerations to support electrical crossover networks. As to be shown herein, eliminating electrical crossovers enhances reliability and also facilitates integration of several types of switching elements in a variety of matrix configurations.

Since the embodiments of U.S. Pat. No. 2,681,423 to Auphan where known prior to U.S. Pat. No. 3,798,620 to Cosentino, and Cosentino failed to utilize the advantages of my invention to eliminate electrical crossover networks, evidently the advantages of my invention where not previously appreciated by those knowledgeable in the state of the art. As to be shown herein, my invention teaches away from prior art.

As identified in application Ser. No. 07/953,118, thin film transistors affixed to an insulating substrate provides latitude in specifying interface components. Such latitude is fundamental to enhancing speed of response of electrostatic light modulators. As identified in the references provided herein, several electrostatic light modulators configured for use in electronic to optical data conversion applications utilize substrate materials which hinders the modulator from utilizing the speed of response intrinsic to reflective conductors. By failing to recognize the fundamentally different electrical and/or mechanical aspects inherent to the various embodiments of U.S. Pat. No. 2,681,423 to Auphan, prior art lacks the necessary implementations to enhance reliability and/or to fully utilize the speed of response intrinsic to reflective conductors in such applications. Such considerations could be important in sub frame addressing.

As identified in application Ser. No. 07/953,118, U.S. Pat. No. 4,694,287 to Chenevas-Paule et al, Sep. 15, 1987, is precluded from functioning as an electrostatic light modulator due to affixing transmissive column electrodes to a second substrate. If additional components are added to U.S. Pat. No. 4,694,287, to incorporate the electrode structure of U.S. Pat. No. 4,694,287 into an electrostatic light modulator configuration, the resulting configuration suffers from several complications. Complications include that each electrode, identified with an E in U.S. Pat. No. 4,694,287, and the respective transistor electrically connected to each electrode are affixed to the same surface of a first substrate. This prevents each electrode form overlapping the respective transistor.

As identified in application Ser. No. 07/953,118, if each electrode does not overlap the respective transistor, the modulator could suffer from a reduced modulation efficiency. As to be shown herein, my invention could utilize both major surfaces of a substrate to allow each electrode to overlap the respective transistor to enhance modulator efficiency.

Additional complications associated with adding components to U.S. Pat. No. 4,694,287, so U.S. Pat. No. 4,694,287 could function in an electrostatic light modulator configuration, include a reduced modulator efficiency due to capacitate voltage division. As identified in application Ser. No. 07/953,118, the evolution of the Deforgraphic Display tube suggests that techniques to enhance modulator efficiency are not obvious.

Additional matrix addressed spatial light modulators for use in electronic to optical data conversion applications include U.S. Pat. No. 4,731,610 to Baron et al, Mar. 15, 1988. Quoting from U.S. Pat. No. 4,731,610, "The present invention is particularly useful in light influencing displays wherein the storage elements take the form of display picture elements and is also useful in other applications, such as in memory matrices." Baron et al provides a definition and description for the pixel elements utilized in the light influencing displays of U.S. Pat. No. 4,731,610. Quoting again from Baron et al, "The pixel 22 further includes a pair of electrodes 40 and 42 which are spaced apart and facing one another. Between the electrodes 40 and 42 is a light influencing material 44. The term "light influencing material" is meant to include any material which emits light or can be used to selectively vary the intensity, phase or polarization of light either being reflected from or transmitted through the material. In accordance with this preferred embodiment, the light influencing material 44 is liquid display material, such as a neumatic liquid material."

As to be shown herein, by increasing the functionality of the column electrodes so as to be reflective and deformable, and by affixing reflective deformable column electrodes to an insulating substrate by a suitable means, as to be described herein, the light influencing material of Baron et al would be an extraneous component in electrostatic light modulator configurations. Several complications exist if the extraneous light influencing material of Baron et al is not eliminated in electrostatic light modulators. Several of these complications are similar to the inefficiencies that plague U.S. Pat. No. 4,694,287 to Chenevas-Paule and precluded the possibility of that patent from functioning in an electrostatic light modulator configurations without extraneous components.

In addition, no suggestions exist in U.S. Pat. No. 4,731,610 on how to affix column electrodes to an insulating support so that the electrodes could function in an electrostatic light modulator configuration. As well understood by those knowledgeable in the state of the art, such consideration are fundamental to the mode of operation of electrostatic light modulators. As to be shown herein, the configuration of my invention represents an unappreciated and unsuggested modification which lacks implementation in the above cited references.

Additional electrostatic light modulators examples exist and include U.S. Pat. No. 3,463,572 to K. Preston Aug. 26, 1969. U.S. Pat. No. 3,463,572 is optically addressed. As well understood by those knowledgeable in the state of the art, optical addressing of electrostatic light modulators employed in electronic to optical data conversion applications could adversely effect signal quality due to unnecessary signal transformations required to optically address such a device. Consequently, optically addressed spatial light modulators are deemed undesirable for use in electronic to optical data conversion applications. This configuration and the references cited herein serve to illustrate an important point; I believe no membrane light modulator has utilized thin film matrix addressing configurations.

OBJECTS AND ADVANTAGES

Accordingly, several objects and advantages of my invention include,

1) To show how backside matrix addressing configurations could enhance commercial viability of membrane light modulators.

2) To introduce thin film matrix addressing configurations for use with membrane light modulators.

3) To introduce thin film matrix addressing configurations which eliminate the requirement for electrical crossover networks in the matrix addressing configuration.

4) To show how reliability, fabrication flexibility, and commercial viability of membrane light modulators could be enhanced.

DESCRIPTION OF INVENTION

Figure 1:
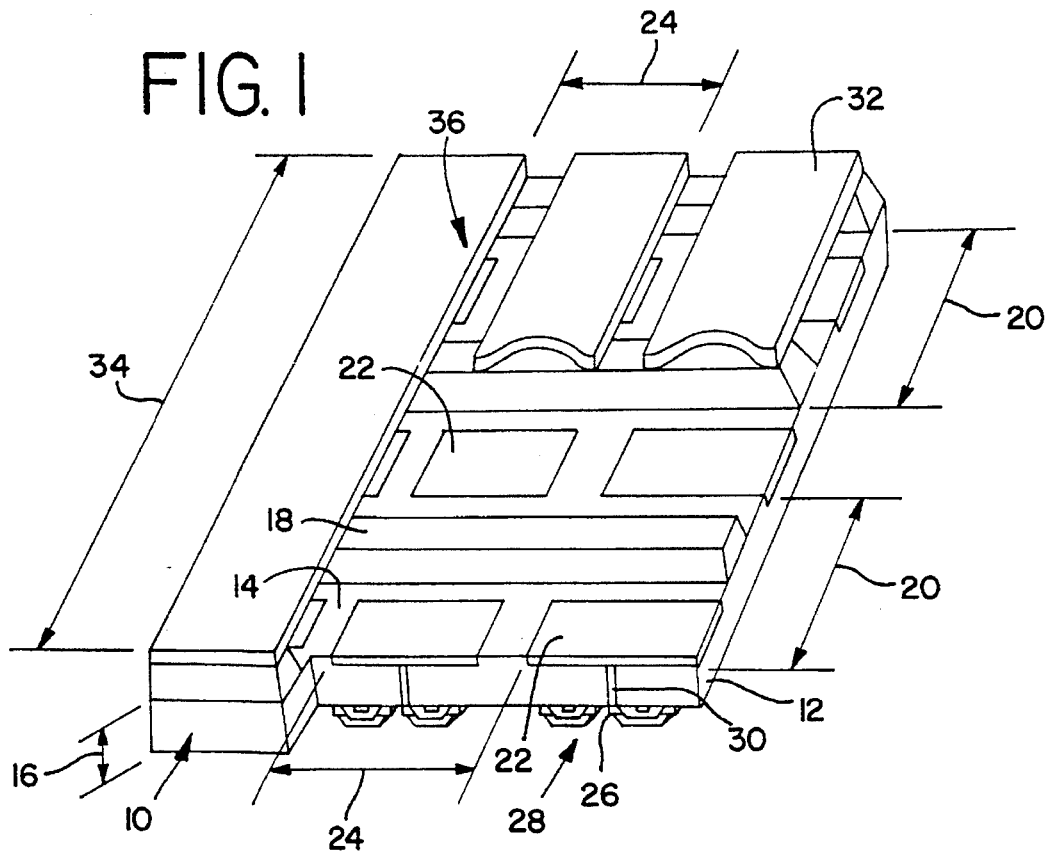
FIG. 1 shows a front side perspective of a membrane light modulator.

FIG. 1 shows a front side perspective of a membrane light modulator array 10. Array 10 contains a substrate 12. Substrate 12 contains a first face 14 and a second face. The second face is not visible in the figure. First face 14 and the second face are separated by a substrate thickness 16. Face 14 further includes a plurality of ridges 18. Adjacent ridges 18 are displaced by a first period 20. Period 20 is perpendicular to thickness 16. Substrate 12 further includes a plurality of first electrodes 22. Electrodes 22 are arranged in a matrix of p rows and q columns. Each electrode 22 is affixed to the substrate by a suitable means. Several suitable means are provided in the references cited herein. Adjacent electrodes 22 in each row p are displaced by a second period 24. Period 24 is perpendicular to thickness 16 and first period 20. Adjacent electrodes 22 in each column q are displaced by first period 20. Each electrode 22 is electrically connected to a respective third switch terminal 26 of a respective switching element 28 by a suitable feedthrough means 30. Each electrode 22 overlapps the respective switching element 28. Array 10 further includes a plurality of flexible reflective column conductors 32. Some conductors, ridges, and portions of the substrate are shown cut away so as to expose the array 10 for clarity. Column conductors 32 are located relative to electrodes 22 so each column q of electrodes 22 is overlapped by a respective conductor 32. Adjacent conductors 32 are displaced by second period 24. Each column conductor 32 posses a column length dimension 34. Dimension 34 is parallel to period 20. Dimension 34 spans the respective column q of electrodes 22. Each first electrode 22 in conjunction with the respective conductor 32 forms a membrane capacitive pixel element 36. A suitable potential control means is provided to control the potential difference of each element 36. This potential difference causes localized deformations of the respective column conductor 32 in the vicinity associated with the respective electrode 22. A suitable means to control the potential difference of each element 36 allows a wavefront incident on array 10 to be phase modulated in accordance with an information bearing signal.

Several switch matrix addressing configurations could be utilized with my invention. Several matrix configurations are described in the article "Liquid Crystal Matrix Displays" by Richard J. Lechner et al, Proceedings of the IEEE, Vol. 59, No. 11, Nov. 1971. Additional information concerning some of the configurations described in that article are further described in U.S. Pat. No. 3,654,606 to Frank Jermone Marlowe et al, Apr. 14, 1972 and U.S. Pat. No. 4,731,610 to Baron et al, Mar. 15, 1988. As identified in the patent application to Craig D. Engle titled "An Enhanced Electrostatic Shutter Mosaic Modulator" several desirable attributes exist with these configurations when operated in a pulse width mode of operation. Consequently, configurations similar to U.S. Pat. No. 3,654,606 have several desirable attributes when employed with my invention.

Figure 2:
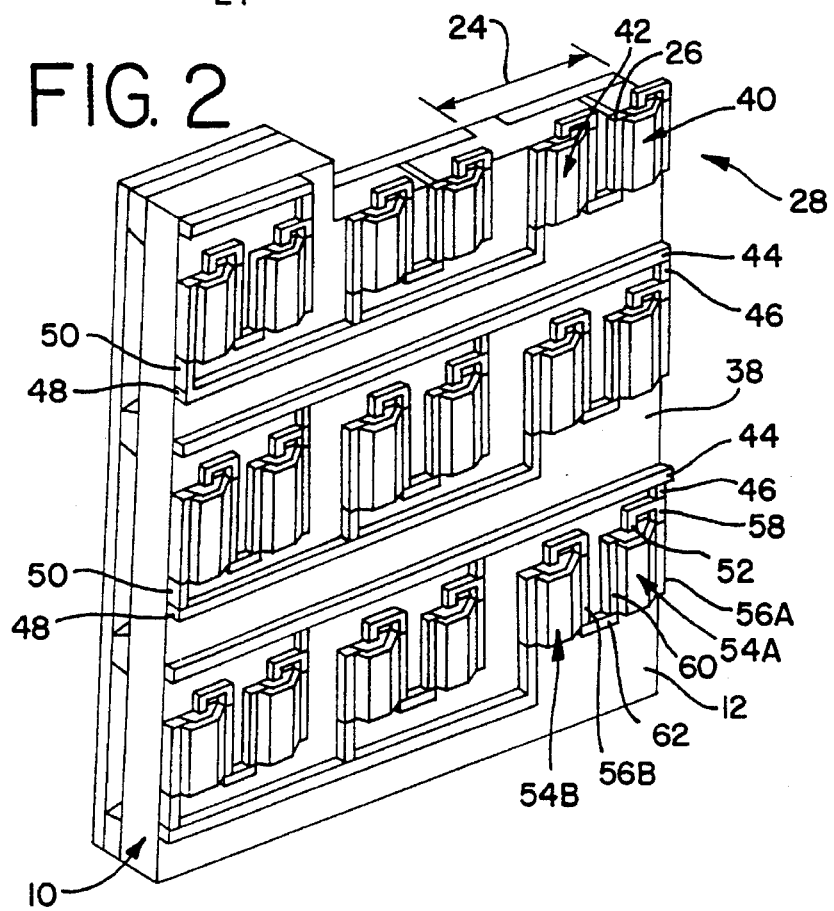
FIG. 2 shows a backside perspective of a membrane light modulator.

FIG. 2 shows a backside perspective of array 10. Array 10 includes a substrate 12. Substrate 12 further includes a second face 38. Affixed to second face 30 is a plurality of switching elements 28. Each switching element 28 could be a threshold device pair 28. Each threshold device pair 28 contains a first threshold device 40 and a second threshold device 42. Every first threshold device 40 in each row p is electrically connected to a respective first row select buss 44 by a respective first switch terminal 46. Every second threshold device 42 in each row p is electrically connected to a respective second row select buss 48 by a respective second switch terminal 50. Every first row select buss 44 is parallel to each second row select buss 48, thereby avoiding electrical crossover networks in the addressing matrix configuration. As well understood by those knowledgeable in the state of the art, eliminating electrical crossover networks could enhance reliability. This is a major advantage of my invention over prior art. The matrix configuration of my invention eliminates crossovers networks, and does not translate crossover requirements to other array components, as in prior art. Each second row select buss 48 in parallel to second period 24. Threshold devices could be any threshold device of the type which provides a high impedance to current flow when reversed biased and a comparatively low impedance to current flow when forward biased. Threshold devices could be diodes. Diodes could be formed from thin film transistors. Threshold devices are drawn to depict diodes formed from thin film transistors. Such diodes could be formed by connecting a gate electrode 52 of a thin film transistor 54 to a respective drain electrode 56 of the transistor 54 by an electrical interconnect 58. Each first threshold device 40 is electrically connected to the respective second threshold device 42 at the respective third switch terminal 26 in a nonopposing fashion. A source electrode 60 of the first transistor 54A is electrically connected to the drain electrode 56 of the second transistor 54B by a third switch terminal interconnect 62. Third switch terminal 26 contains the source electrode 60 of the first transistor 54A, the respective drain electrode 56B of the second transistor 54B, and the respective third switch terminal interconnect 62. Methods of sequencing the first row select buss and the respective second row select buss in conjunction with potentials applied to the column electrodes to control the potential difference between each first electrode and the respective column electrode in a selected row of pixel elements are well understood by those knowledgeable in the state of the art. As identified in the references cited herein, several options exist when interfacing suitable potential control means circuitry to the modulator so as to enhance flexibility in fabricating a membrane light modulator. Such considerations could enhance commercial viability of membrane modulators.

The substrate of my invention could be an insulating substrate. The substrate could be a machinable photosensitive glass. Such materials are described in the article "Glass and Glass-Ceramics for Applications in Micromechanics" by D. Hulsenberg and R. Bruntsch, Journal of Non Crystalline Solids 129 (1991) 199–205. Feedthroughs could be fabricated in the substrate by a variety of means. "Wire Mosaics" have been utilized in several display applications; see for instance "Reflective Liquid Crystal Television Display" by John a Van Raalte, Proceedings of the IEEE, Vol. 56, No. 12, Dec. 1968, and "Random Access Light Value Study" by O. F. Hamann, Technical Support No. RADC-TR-65-451. As described in the references provided herein, the first face of a substrate containing feedthroughs could be polished optically flat. Having the latitude to process the substrate to this degree of perfection is fundamental to eliminating the influence of contamination. Processing operations such as polishing could be implemented in my invention due to the method of construction and dual face fabrication flexibility. This represents a significant advantage over prior art. Coupled with the processing operations cited in the referenced provided herein, my invention could enhance commercial viability of membrane light modulators. As previously mentioned, these advantages are available with no electrical crossover networks in the active switch addressing configuration, greatly enhancing the reliability of my invention.

Ridges represent a suitable means to affix the column conductors to the first face of the substrate. A identified in the references provided herein, several suitable means exist to affix column conductors to the first face of the substrate. Additional means to fabricate column conductors include techniques described in U.S. Pat. No. 2,682,010 to R. K. Orthuber et al, Mar. 2, 1954, U.S. Pat. No. 2,733,501, to R. K. Orthuber et al, Feb. 7, 1956, and U.S. Pat. No. 2,644,208, to M. Auphan, Jul. 7, 1953.

Utilizing both faces of a substrate allows access to components affixed to the respective face with out unduly influencing components affixed to the other face. Processing options are greatly enhanced by this feature of my invention. Processing options required for components affixed to respective faces don't necessarily have to be merged, providing greater freedom for fabricating respective components. Furthermore, as a consequence of dual face processing, any additional processing steps which could be required to ensure compatibility when integrating merged sequences for processing with front side device configurations, as in prior art, could be avoided in my invention. The dual face processing capability of my invention enhances the capabilities of membrane light modulators.

Although thin film components could be utilized as switching elements, several other switching elements could be utilized. It could be possible to utilize laser-induced crystallization of silicon islands affixed to the second face of the substrate to fabricate switching elements. This option for fabricating switching elements accentuates the flexibility inherent in my invention.

Although a no crossover matrix addressing configuration has been described, several advantages of my invention could be realized by other switch matrix addressing configurations, including configurations employing crossover networks.

SUMMARY, RAMIFICATIONS, AND SCOPE

Although the description above contains many specifications, these should not be construed as limiting the scope of the invention but merely providing illustrations of some of the presently preferred embodiments of this invention. For instance, several switching elements exist. See U.S. Pat. No. 4,713,610 to Baron et al, Mar. 15, 1988. In addition, new transistor structures are being developed to serve a variety of applications. See information in the article "Present and Future Applications of Amorphous Silicon and it's Alloys" by P. G. Comber, Journal of Non-Crystalline Solids 115 (1989) 1–13. Utilizing the information contained herein, several suitable switching elements may be utilized to realize advantages of my invention.

Several suitable means exist to affix switching elements to the second face of the substrate. As well understood by those knowledgeable in the state of the art, thin film components could be vacuum deposited on the second face. Suitable means could include affixing an insulating layer to the second face of the substrate. Such a layer could be phosphosilicate glass or silicon dioxide. Switching elements could be affixed to the exposed face of the insulating layer. The insulating layer could be etched to establish feedthroughs to electrically connect to the feedthroughs in the modulator substrate. Use of an insulating layer affixed to the insulating substrate of the modulator could allow for finer dimensions to be achieved with feedthroughs etched in the insulating layer as compared to the modulator substrate. This could allow the switching elements to overlap respective feedthroughs in the modulator substrate without shorting the switching elements. This technique could enhance spatial resolution of the modulator.

Use of the insulating layer disposed between the modulator substrate and the switching elements, to assist in affixing switching elements to the substrate, could expand material options available for, and the type of, switching elements utilized in the addressing matrix configuration. These considerations are well understood by those knowledgeable in the state of the art, and are available for consideration in my invention due to the flexibility inherent in my invention. Examples could include laser-induced crystallization of silicon islands affixed to the second face.

As previously identified, several active switch matrix addressing configurations could be utilized with my invention. Although a no crossover matrix configuration provides additional advantages, it does not infer that a matrix configuration with crossovers is precluded from use in my invention. This is important because it is believed that no thin film switch matrix addressing configuration affixed to the second face of the modulator substrate has been proposed for use with membrane light modulators. Accordingly, the suitable potential control means to control the potential difference between each first electrode and the respective column conductor could be expanded to include a suitable means to electrically connect the first switch terminals and the second switch terminals in a manner consistent with the desired matrix configuration. Suitable means to perform these functions with the matrix configuration described herein would include every first row select buss and every second row select buss.

A matrix configuration containing crossovers is described in the references provided herein. The matrix is a "field effect transistor capacitor" addressing configuration and is shown in FIG. 13 in the article "Liquid Crystal Displays". Suitable potential control means for this configuration could include a plurality of first terminal column busses (to be distinguished from the column electrodes 34 described earlier) to electrically connect every first switch terminal in each column to a respective column buss voltage source (identified as C1, C2, etc. in FIG. 13a). The suitable potential control means could further include a suitable means to hold each column electrode at a respective fixed potential (identified as ground potential in FIG. 13) Suitable potential control means further includes electrically connecting every second terminal in each row by a respective row buss. A row of switching elements could be selected as previously described (with row pulse generators in FIG. 13), and each third switch terminal in the selected row could be charged to a potential related to the value of the respective column buss voltage source.

As evident to those knowledgeable in the state of the art, having each column electrode maintained at a common potential is electrically similar to a monolithic conductor, such as those utilized with front side component configuration or prior art. Suitable means to affix a monolithic conductor to the first face could include a nonconducting membrane. Us of a monolithic membrane could be utilized with backside thin film switch matrix configurations to obtain several advantages of my invention. Accordingly, such configurations represent alternative embodiments of my invention. Utilization of backside electronics avoids the requirement of extraneous light blocking components, such as field plates, since the substrate could perform this function, further increasing it's functionality. This is an important consideration for several switching components, including a:Si, see information in the article "Very Simple a-Si:H TFT Fabrication Process for LCD-TV Application" by Michel Le Contellec et al, Journal of Non-Crystalline Solids 97 & 98 (1987) 297–300.

Finally, as well understood by those knowledgeable in the state of the art, my invention could be operated in a analog or a pulse width modulated mode of operation.

As can be seen several benefits are available with my invention. Accordingly, the scope of my invention should be determined not by the embodiments illustrated, but by the appended claims and their legal equivalents.

I claim:

1. An enhanced membrane light modulator for use in phase modulating an electromagnetic wavefront incident thereon in electronic to optical data conversion applications comprising:

an insulating substrate, a plurality of electrodes arranged into a matrix of p rows and q columns, each said electrode is affixed to said substrate by a suitable means, overlapping each column q of said electrodes is a respective reflective deformable conductor, each said conductor is affixed to said substrate by a suitable conductor affixing means in such manner to electrically isolate the conductors from one another thereby enhancing functionality of the conductors, a plurality of electronic switching elements, each said electronic switching element further includes a first switch terminal, a second switch terminal and a third switch terminal, every said electronic switching element further includes a respective first threshold device electrically connected between said first switch terminal and said third switch terminal, every said electronic switching element further includes a respective second threshold device electrically connected between said second switch terminal and said third switch terminal, said respective first threshold device of every said electronic switching element is of the type which provides a low impedance to current flow when forward biased into an on condition, said respective second threshold device of every said electronic switching element is of the type which provides a low impedance to current flow when forward biased into an on condition, each said electrode is electrically connected by a suitable electrical interconnect means to a respective electronic switching element, each said electronic switching element is affixed to said substrate by a suitable switching element affixing means, the first switch terminals of said electronic switching elements which are electrically connected to said electrodes in each row p are electrically connected by a respective first row buss, the second switch terminals of said electronic switching elements which are electrically connected to said electrodes in each row p are electrically connected by a respective second row buss, each said respective second row buss is essentially parallel to every said respective first row buss thereby enhancing reliability by eliminating electrical crossover networks, a suitable potential control means to control an applied potential difference between each said electrode and the respective conductor in accordance with an information bearing signal whereby reliability and commercial viability of the modulator are enhanced.

2. The device of claim 1 wherein said substrate further includes a first major surface and a second major surface, said first major surface and said second major surface are opposing surfaces, each said conductor is affixed to said first major surface by said suitable conductor affixing means.

3. The device of claim 2 wherein said respective first threshold device and said respective second threshold device of every said electronic switching element are electrically connected in a nonopposing manner.

4. The device of claim 3 wherein said respective first threshold device of every said electronic switching element comprises a thin film transistor and said respective second threshold device of every said electronic switching element comprises a thin film transistor.

5. The device of claim 4 wherein every said electronic switching element is affixed to said second major surface by said suitable switching element affixing means, every said respective first row buss is affixed to said second major surface by a suitable means, every said respective second row buss is affixed to said second major surface by a suitable means, each said electrode overlaps said respective electronic switching element thereby enhancing efficiency and reliability of the modulator.

6. An enhanced membrane light modulator for use in phase modulating an electromagnetic wavefront incident thereon in electronic to optical data conversion applications comprising:

an insulating substrate, said substrate further includes a first major surface and a second major surface, said first major surface and said second major surface are opposing surfaces, a plurality of electrodes arranged into a matrix of p rows and q columns, each said electrode is affixed to said substrate by a suitable means, overlapping each column q of said electrodes is a respective reflective deformable conductor, each said conductor is affixed to said first major surface by a suitable means in such manner to electrically isolate the conductors from one another thereby enhancing functionality of the conductors, a plurality of electronic switching elements, each said electronic switching element further includes a first switch terminal, a second switch terminal and a third switch terminal, every said electronic switching element further includes a respective first threshold device electrically connected between said first switch terminal and said third switch terminal, every said electronic switching element further includes a respective second threshold device electrically connected between said second switch terminal and said third switch terminal, said respective first threshold device of every said electronic switching element is of the type which provides a low impedance to current flow when forward biased into an on condition, said respective second threshold device of every said electronic switching element is of the type which provides a low impedance to current flow when forward biased into an on condition, each said electrode is electrically connected by a suitable electrical interconnect means to a respective electronic switching element, each said electronic switching element is affixed to said second major surface by a suitable means, the first switch terminals of said electronic switching elements which are electrically connected to said electrodes in each row p are electrically connected by a respective first row buss, each said respective first row buss is affixed by a suitable means to said second major surface, the second switch terminals of said electronic switching elements which are electrically connected to said electrodes in each row p are electrically connected by a respective second row buss, each said respective second row buss is affixed by a suitable means to said second major surface, each said respective second row buss is essentially parallel to every said respective first row buss thereby enhancing reliability by eliminating electrical crossover networks, a suitable potential control means to control an applied potential difference between each said electrode and the respective conductor in accordance with an information bearing signal whereby reliability and commercial viability of the modulator are enhanced.

7. The device of claim 6 wherein said respective first threshold device and said respective second threshold device of every said electronic switching element are electrically connected in a nonopposing manner.

8. The device of claim 7 wherein said respective first threshold device of every said electronic switching element comprises a thin film transistor and said respective second threshold device of every said electronic switching element comprises a thin film transistor, each said electrode overlaps said respective electronic switching element thereby enhancing efficiency and reliability of the modulator.

9. An enhanced electrostatic light modulator for use in modulating an electromagnetic wavefront incident thereon in electronic to optical data conversion applications comprising:

an insulating substrate, a plurality of electrodes arranged into a matrix of p rows and q columns, each said electrode is affixed to said substrate by a suitable means, overlapping each said electrode is a respective reflective conductor, each said conductor is affixed to said substrate by a suitable conductor affixing means in such manner to electrically isolate the conductors from one another thereby enhancing functionality of the conductors, a plurality of electronic switching elements, each said electronic switching element further includes a first switch terminal, a second switch terminal and a third switch terminal, every said electronic switching element further includes a respective first threshold device electrically connected between said first switch terminal and said third switch terminal, every said electronic switching element further includes a respective second threshold device electrically connected between said second switch terminal and said third switch terminal, said respective first threshold device of every said electronic switching element is of the type which provides a low impedance to current flow when forward biased into an on condition, said respective second threshold device of every said electronic switching element is of the type which provides a low impedance to current flow when forward biased into an on condition, the conductors which are overlapping said electrodes in each column q are electrically connected, each said electrode is electrically connected by a suitable electrical interconnect means to a respective electronic switching element, each said electronic switching element is affixed to said substrate by a suitable switching element affixing means, the first switch terminals of said electronic switching elements which are electrically connected to said electrodes in each row p are electrically connected by a respective first row buss, the second switch terminals of said electronic switching elements which are electrically connected to said electrodes in each row p are electrically connected by a respective second row buss, each said respective second row buss is essentially parallel to every said respective first row buss thereby enhancing reliability, a suitable potential control means to apply between each said electrode and the respective conductor a respective potential difference, whereby varying each said respective potential difference varies the separation between said respective conductor and the electrode thereby modulating said wavefront whereby reliability and commercial viability of the modulator are enhanced.

10. The device of claim 9 wherein said substrate further includes a first major surface and a second major surface, said first major surface and said second major surface are opposing surfaces, each said conductor is affixed to said first major surface by said suitable conductor affixing means.

11. The device of claim 10 wherein said respective first threshold device and said respective second threshold device of every said electronic switching element are electrically connected in a nonopposing manner.

12. The device of claim 11 wherein said respective first threshold device of every said electronic switching element comprises a thin film transistor and said respective second threshold device of every said electronic switching element comprises a thin film transistor.

13. The device of claim 12 wherein every said electronic switching element is affixed to said second major surface by said suitable switching element affixing means, every said respective first row buss is affixed to said second major surface by a suitable means, every said respective second row buss is affixed to said second major surface by a suitable means, each said electrode overlaps said respective electronic switching element.

14. An enhanced electrostatic light modulator for use in modulating an electromagnetic wavefront incident thereon in electronic to optical data conversion applications comprising:

an insulating substrate, a plurality of electrodes affixed to said substrate by a suitable means, overlapping each said electrode is a respective reflective conductor, each said conductor is affixed to said substrate by a suitable means thereby enhancing functionality of the conductors, a plurality of thin film transistors, each said transistor further includes a first terminal, a second terminal and a third terminal, each said electrode is electrically connected by a suitable means to a respective thin film transistor, each said transistor is affixed to said substrate by a suitable means, a suitable potential control means to apply between each said electrode and the respective conductor a respective potential difference, whereby varying each said respective potential difference varies the separation between said respective conductor and the electrode thereby modulating said wavefront incident thereon efficiently, and reliably so as to enhance commercial viability of the modulator.

15. The device of claim 14 wherein adjacent ones of said electrodes are displaced by a first period.

16. An enhanced membrane light modulator for use in phase modulating an electromagnetic wavefront incident thereon in electronic to optical data conversion applications comprising:

an insulating substrate, a plurality of electrodes, adjacent ones of said electrodes are displaced by a first period, each said electrode is affixed by a suitable means to said substrate, overlapping every said electrode is a reflective deformable conductor, said conductor is affixed to said substrate by a suitable means thereby enhancing functionality of the conductor, a plurality of thin film transistors, each said transistor further includes a first terminal, a second terminal and a third terminal, each said electrode is electrically connected by a suitable means to a respective thin film transistor, each said transistor is affixed by a suitable means to said substrate, a suitable potential control means to control an applied potential difference between each said electrode and the conductor in accordance with an information bearing signal whereby reliability and commercial viability of the modulator are enhanced.

\* \* \* \* \*